(12) United States Patent
Sung et al.

(10) Patent No.: US 10,622,868 B2
(45) Date of Patent: Apr. 14, 2020

(54) COOLANT FLOW DISTRIBUTION USING COATING MATERIALS

(71) Applicant: FORD GLOBAL TECHNOLOGIES, LLC, Dearborn, MI (US)

(72) Inventors: Myung Ki Sung, Ypsilanti, MI (US); Edward Chan-Jiun Jih, Troy, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 466 days.

(21) Appl. No.: 15/473,081

(22) Filed: Mar. 29, 2017

(65) Prior Publication Data
US 2018/0287464 A1  Oct. 4, 2018

(51) Int. Cl.
| H02K 9/19 | (2006.01) |
| H02K 5/20 | (2006.01) |
| B60L 3/00 | (2019.01) |
| B60L 50/50 | (2019.01) |

(52) U.S. Cl.
CPC .............. H02K 9/19 (2013.01); B60L 3/0061 (2013.01); H02K 5/20 (2013.01); B60L 50/50 (2019.02); B60L 2240/425 (2013.01)

(58) Field of Classification Search
CPC ............ H02K 1/06; H02K 15/02; H02K 9/19; H02K 1/12; H02K 7/006; B60L 11/18; B60L 50/51
See application file for complete search history.

(56) References Cited

U.S. PATENT DOCUMENTS

| 4,384,725 | A | 5/1983 | Nenov |
| 5,042,991 | A | 8/1991 | Kunz et al. |
| 6,103,379 | A | 8/2000 | Margel et al. |
| 6,458,867 | B1 | 10/2002 | Wang et al. |
| 6,503,958 | B2 | 1/2003 | Hughes et al. |
| 6,645,569 | B2 | 11/2003 | Cramer et al. |
| 6,723,378 | B2 | 4/2004 | Hrubesh et al. |
| 6,743,467 | B1 | 6/2004 | Jones et al. |
| 7,985,451 | B2 | 7/2011 | Luzinov et al. |
| 7,989,619 | B2 | 8/2011 | Guire et al. |
| 7,998,554 | B2 | 8/2011 | Wang et al. |
| 8,007,638 | B2 | 8/2011 | Baker et al. |
| 8,187,707 | B2 | 5/2012 | Van Benthem et al. |
| 8,202,614 | B2 | 6/2012 | Koene et al. |
| 8,258,206 | B2 | 9/2012 | Kanagasabapathy et al. |
| 8,361,176 | B2 | 1/2013 | Seth et al. |
| 9,960,649 | B2 * | 5/2018 | Yoshinori ................ H02K 1/32 |

(Continued)

FOREIGN PATENT DOCUMENTS

WO   2013/058843 A2   4/2013

*Primary Examiner* — Jermele M Hollington
*Assistant Examiner* — Leda T Pham
(74) *Attorney, Agent, or Firm* — David Kelley; Brooks Kushman P.C.

(57) ABSTRACT

An electric machine is disclosed. The electric machine includes a stator core defining a cavity and having end-windings protruding from the cavity, and a rotor configured to rotate within the cavity and having end plates defining a plurality of holes for providing coolant. The electric machine also includes one or more layers of an oleophobic or hydrophobic coating disposed on portions of the end plate corresponding to the holes to increase coolant flow to the end-windings.

17 Claims, 4 Drawing Sheets

(56) References Cited

U.S. PATENT DOCUMENTS

| | | | |
|---|---|---|---|
| 2003/0094872 A1* | 5/2003 | Tornquist | H02K 1/325 310/91 |
| 2006/0029808 A1 | 2/2006 | Zhai et al. | |
| 2008/0299359 A1* | 12/2008 | Klaussner | H02K 3/38 428/206 |
| 2009/0091088 A1* | 4/2009 | Berendt | F16J 15/3224 277/307 |
| 2010/0080723 A1* | 4/2010 | Hollister | F01C 21/0881 418/152 |
| 2010/0194220 A1* | 8/2010 | Tatematsu | H02K 1/2766 310/61 |
| 2010/0237725 A1* | 9/2010 | Tatematsu | B60L 50/66 310/61 |
| 2010/0295395 A1* | 11/2010 | Baudelocque | F16C 32/047 310/86 |
| 2010/0314575 A1 | 12/2010 | Gao et al. | |
| 2012/0009396 A1 | 1/2012 | Sikka et al. | |
| 2012/0045954 A1 | 2/2012 | Bleecher et al. | |
| 2012/0055193 A1 | 3/2012 | Fukasaku | |
| 2013/0109261 A1 | 5/2013 | Koene | |
| 2015/0318770 A1* | 11/2015 | Behrendt | B05D 5/083 310/45 |

\* cited by examiner

COOLANT FLOW DISTRIBUTION USING COATING MATERIALS

TECHNICAL FIELD

The present disclosure relates to the use of coating materials for coolant flow distribution, for example, in electric machines and/or inverters.

BACKGROUND

The power density of electronic devices, such as electric machines and power inverters, is continuously increasing to meet weight and cost reduction targets. To meet these targets, it is generally important to increase the efficiency and performance of the electronic device. The performance and efficiency of electric machines are generally limited by the temperature constraint on the copper windings and/or the maximum current which should overcome the friction losses in the air gap. For electric machine thermal management, it may be important to maintain uniform coolant flow (e.g., water/glycol, oil, or Automatic Transmission Fluid) on the end windings of the electric machine to remove the localized hot spots. The performance and efficiency of power inverters are generally limited by the thermal constraints in insulated-gate bipolar transistors (IGBTs) and/or diodes. For inverter thermal management, a liquid cold plate may be used to cool components, such as IGBTs, diodes, solder layers, etc., inside the inverter.

SUMMARY

According to an embodiment, an electric machine is disclosed. The electric machine includes a stator core defining a cavity and having end-windings protruding from the cavity, and a rotor configured to rotate within the cavity and having end plates defining a plurality of holes for providing coolant. The electric machine also includes one or more layers of an oleophobic or hydrophobic coating disposed on portions of the end plate corresponding to the holes to increase coolant flow to the end-windings.

In one or more embodiments, the electric machine may further include one or more layers of a oleophilic or hydrophilic coating defining a coolant flow path on the end plates for directing coolant to the portions of the end plate in cooperation with the one or more layers of the oleophobic or hydrophobic coating. The coolant may impinge the one or more layers of the oleophobic or hydrophobic coating generating coolant jet flow to the end-windings. The one or more layers of the oleophobic or hydrophobic coating may be a super oleophobic or hydrophobic coating having a contact angle with an oil-based or water-based coolant of at least 130 degrees, respectively. Each hole may correspond with one or more layers of the oleophobic or hydrophobic coating to direct coolant from the hole to the end-windings. The one or more layers of the oleophobic or hydrophobic coating may be disposed on portions of the end plate at an angle corresponding to the holes and rotation direction of the rotor.

According to an embodiment, an electric machine is disclosed. The electric machine includes a stator core defining a cavity and having end-windings protruding from the cavity, and a rotor configured to rotate within the cavity and having end plates defining a plurality of holes for providing coolant. The electric machine also includes one or more layers of an oleophobic or hydrophobic patterned coating defining at least one boundary on the end plate between the holes and end-windings to direct coolant on a flow path to the end-windings.

In one or more embodiments, the electric machine may further include one or more layers of a oleophilic or hydrophilic patterned coating on the end plates in the flow path to direct coolant to the end-windings. The one or more layers of the oleophobic or hydrophobic patterned coating may define two spaced apart boundaries that define the flow path. The one or more layers of the oleophobic or hydrophobic patterned coating may define intermittent boundaries for coolant flow separation. The intermittent boundaries may include at least one boundary line forming a primary coolant flow path and at least one boundary step in a portion of the primary coolant flow path to form one or more secondary coolant flow paths. The at least one boundary step may be configured to generate coolant jet flow after impinging the boundary step. The one or more layers of the oleophobic or hydrophobic patterned coating may define a zig-zag boundary to direct coolant flow on a zig-zag coolant flow path from the hole to the end-windings. The one or more layers of the oleophobic or hydrophobic patterned coating may be a super oleophobic or hydrophobic coating having a contact angle with an oil-based or water-based coolant of at least 130 degrees, respectively. The at least one boundary may be positioned according to a rotation direction of the rotor.

According to an embodiment, an electric machine is disclosed. The electric machine includes a stator core defining a cavity and having end-windings protruding from the cavity, and a rotor configured to rotate within the cavity and having end plates defining a plurality of holes for providing coolant. The electric machine also includes one or more layers of an oleophobic or hydrophobic patterned coating defining at least one ring on the end plate radially outward from the holes.

In one or more embodiments, the one or more layers of the oleophobic or hydrophobic patterned coating may be a super oleophobic or hydrophobic coating having a contact angle with an oil-based or water-based coolant of at least 130 degrees, respectively. The one or more layers of the oleophobic or hydrophobic patterned coating may be configured to generate coolant jet flow after impinging the at least one ring. Based on a rotor speed, the at least one ring may be positioned on the end plate and may be configured to inject coolant at a predefined coolant injection angle. The electric machine may further include one or more layers of a oleophilic or hydrophilic patterned coating on the end plate defining a flow path for directing coolant to the at least one ring.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Some electric machines, for example, an electric machine for a hybrid vehicle or an electric vehicle, operate in harsh conditions. The harsh conditions may include temperature, humidity, airflow, and debris. The harsh conditions may be attributed to environmental aspects that may be further exacerbated by requirements of the electric machine, such as constraints on size, configuration, input power, and output power. To help reduce heat generated during the operation of the electric machine, a cooling system may be used. The cooling system may include a fluid that flows around winding and components of the electric machine. In some cases, the fluid is in contact with the windings and components of the electric machine. The fluid may then be circulated, for example through a radiator, to remove some of the heat from the electric machine. For example, in some automotive systems, an electric machine is cooled with the automatic transmission fluid (ATF) that is circulated around the windings and components and then circulated to a radiator. Typically, the electric machine is configured such that coolant flows to the stator end-windings through rotor end plate holes using centrifugal force generated by the rotor spinning. Effective coolant distribution may improve cooling performance and remove hot spots on the end-windings. As such, the overall thermal performance of the electric machine may be improved.

According to one or more embodiments of the present disclosure, flow distributions may be controlled by applying advanced coating materials, including a "repellant" coating and a wetting coating. For example, repellant coatings include oleophobic, super-oleophobic, hydrophobic, and super-hydrophobic coatings. Wetting coatings include oleophilic, super-oleophilic, hydrophilic, and super-hydrophilic coatings. Both repellant and wetting coatings may be applied to the electric machine to improve efficiency. Advanced coating components will increase or decrease the contact angle of the ATF (or other liquid) on the coated surface.

Figure 1A:
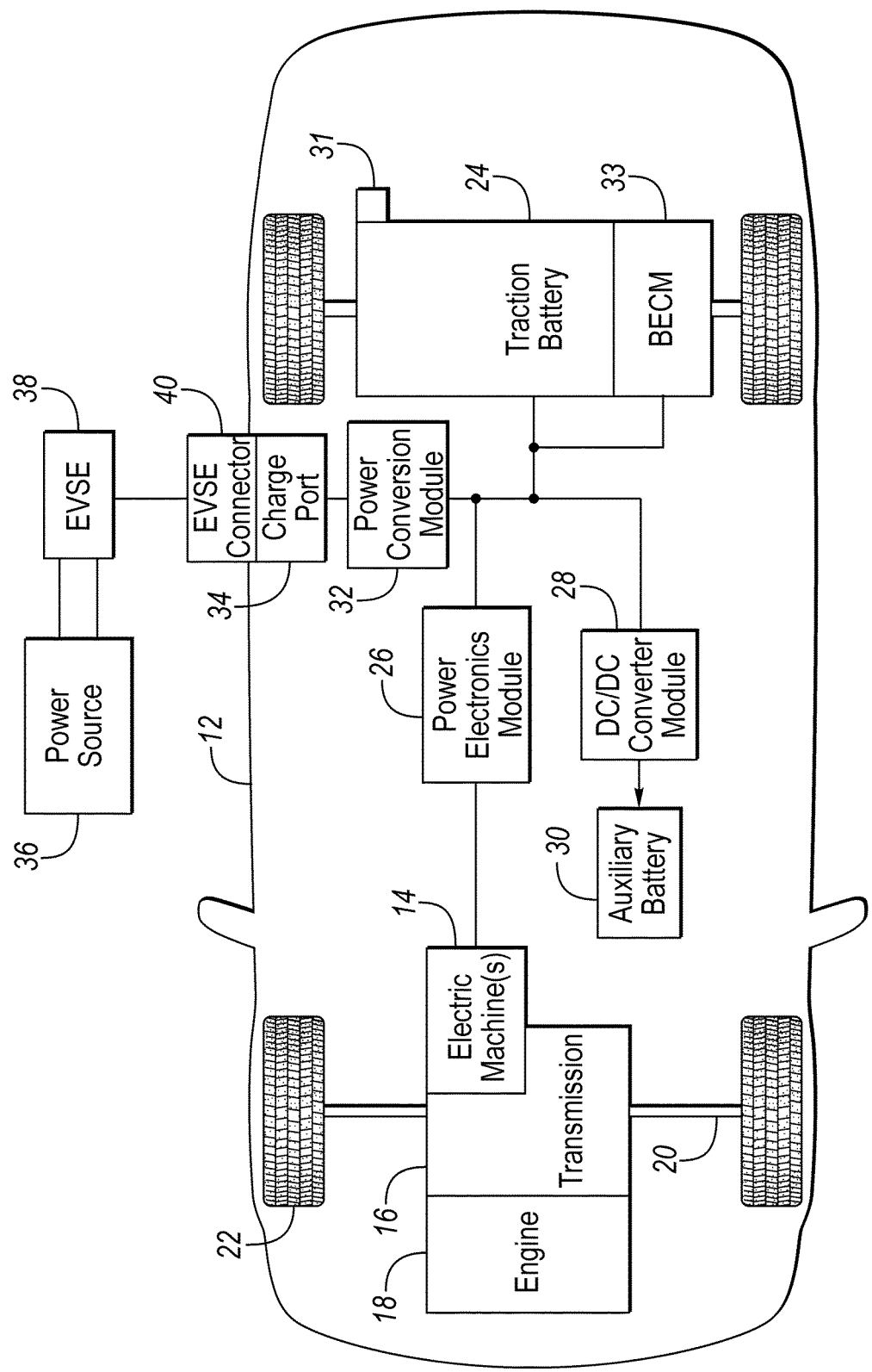
FIG. 1A is a schematic diagram illustrating an example of an electrified vehicle.

FIG. 1A depicts a schematic of an example of a PHEV, referred to as a vehicle herein. The vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to a set of wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may also be electrically connected to the electric machines 14 and provides the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter module 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter module 28. The low-voltage systems may be electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electrified vehicle which includes components for a PHEV, a FHEV, a MHEV, or a BEV. The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. The various components discussed may have one or more associated controllers to control and monitor the operation of the components. The controllers may communicate via a serial bus (e.g., Controller Area Network (CAN)) or via discrete conductors.

Current examples of thermal management assemblies for electric machines may introduce oil to portions of the electric machine for cooling purposes. The oil may be dripped or sprayed onto wire end windings of the electric machine. However, this practice may not be very effective in cooling the end windings due to a non-uniformity of coolant flow as applied to the end windings. An air cooled thermal management assembly is another example of an assembly to assist in managing thermal conditions of an electric machine. In this example, a fan or blower may be located adjacent the end windings to push air thereto for cooling purposes.

Figure 1B:
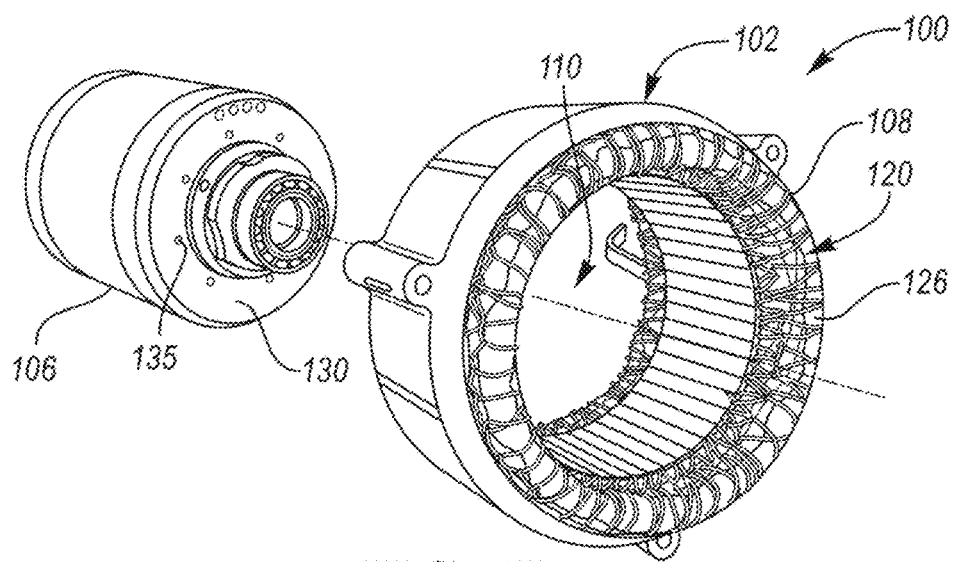
FIG. 1B is a perspective view of an exemplary electric machine.

FIG. 1B shows an example of an electric machine for an electrified vehicle, referred to generally as electric machine 100. The electric machine 100 may include a stator core 102 and a rotor 106. Electrified vehicles may include two, or more, electric machines. For example, for an electrified vehicle with two electric machines, one of the electric machines may function primarily as a motor and the other may function primarily as a generator. The motor may operate to convert electricity to mechanical power and the generator may operate to convert mechanical power to electricity. The stator core 102 may include an inner surface 108 defining a cavity 110. The stator 102 may also include windings 120. Windings 120 may be disposed within the cavity 110 of the stator core 102. In an electric machine motor, for example, current may be fed to the windings 120 to obtain a rotation force on the rotor 106. In an electric machine generator, for example, current generated in the windings 120 by a rotation of the rotor 106 may be removed to power vehicle components. Portions of the windings 120, referred to as end-windings 126, may protrude from the cavity 110. During operation of the electric machine 100, heat may be generated along the windings 120 and end windings 126.

The rotor 106 may be sized for disposal and operation within the cavity 110. A shaft (not shown) may be operably connected to the rotor 106 to drive rotation thereof. The rotor 106 includes at least one end plate 130, defining at least one hole 135. Holes 135 in end plate 130 provide an inlet for coolant to the end-windings 126 of the stator core 102. Coolant is fed through the rotor shaft (not shown) to cool down the rotor iron core and magnet temperatures. After cooling the rotor core, due to centrifugal force generated by the rotor 106 spinning, coolant is pushed out and injected through the holes 135 toward the end-windings 126. Holes 135 are shown in a radially disposed pattern for illustrative purposes, and may be in any pattern based on the desired coolant injection. Coolant is injected through the holes 135 at various rates depending on the speed of the rotor 106. The injection angle of the coolant to the end-windings 126 also may vary based on the speed of the rotor. High rotor speed may correspond to high coolant flow velocities and larger injection angles due to the centrifugal force pushing coolant through the holes 135. High coolant flow velocity, such as jet flow, may increase cooling performance and improve coolant spread effects on the end-windings 126.

Figure 2:
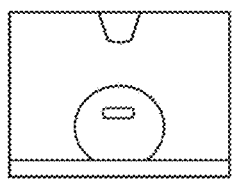
FIG. 2 is a schematic of a droplet of water (or oil) on a super hydrophobic (or super oleophobic) coating surface having a contact angle of at least 130 degrees.

In at least one embodiment, the present disclosure includes the application of a coating or coatings to affect, alter, and/or control coolant distribution on the electric machine. The coating(s) may be a (super) hydrophobic and/or (super) oleophobic coating or a (super) hydrophilic and/or (super) oleophilic coating. Hydrophobic and oleophobic coatings are those that repel or have a very high contact angle with water and oil, respectively. Hydrophilic and oleophilic coatings are those that attract or have a very low contact angle with water and oil, respectively. With reference to FIG. 2, a schematic of a droplet of water or oil (e.g., automatic transmission fluid, ATF) is shown on a super hydrophobic/oleophobic coating. As shown, the droplet forms almost a perfect sphere on the coating due to its repellence. Super hydrophobic/oleophobic coatings may cause droplets of water/oil to form contact angles of 130 degrees or higher with the coating. In contrast, on super hydrophilic and oleophilic coatings, droplets spread out and form an almost even layer on top of the coating. Super hydrophilic/oleophilic coatings may cause droplets of water/oil to form contact angles of 25 degrees or lower with the coating.

Any suitable hydrophobic, oleophobic, super hydrophobic, or super oleophobic coatings may be used in accordance with the present disclosure. In general, such coatings may have a high contact angle with the water or oils. Hydrophobic/oleophobic materials may generally be those forming a contact angle of at least 90 degrees, such as at least 100, 110, 120, 130, or 140 degrees, while super hydrophobic/oleophobic materials may generally be those forming a contact angle of at least 130 degrees with water/oil. The coatings may form such high contact angles as a result of a nano-scale surface structure. For example, the surface of the coating may be covered in very small projections, making the coating rough on a nano-scale. The gaps between the projections may trap air and make it energetically unfavorable for liquids to wet the surface. Similarly, any suitable hydrophilic, oleophilic, super hydrophilic, or super oleophilic coatings may be used in accordance with the present disclosure. In general, such coatings may have a low contact angle with the water or oils. Hydrophilic/oleophilic materials may generally be those forming a contact angle of at most 50 degrees, such as at most 40 or 30 degrees, while super hydrophilic/oleophilic materials may generally be those forming a contact angle of 25 degrees or less with water/oil.

Examples of various (super) hydrophobic/oleophobic and (super) hydrophilic/oleophilic compositions and treatment methodologies are provided in U.S. Patent Publication Nos. 2013/0109261, 2012/0009396, 2010/0314575, 2012/0045954, and 2006/0029808, and also in U.S. Pat. Nos. 8,007,638, 6,103,379, 6,645,569, 6,743,467, 7,985,451, 8,187,707, 8,202,614, 7,998,554, 7,989,619, 5,042,991, 8,361,176, 8,258,206, 6,458,867, 6,503,958 and 6,723,378, and also in International Publication No. WO2013/058843, the disclosures of which are incorporated herein by reference.

The (super) hydrophobic/oleophobic coating may be applied to the electric machine using any suitable method, which may depend on the composition of the coating itself. In one embodiment, the coating may be applied by spraying. In another embodiment, the coating may be applied using a form of deposition, such as physical vapor deposition (PVD) or chemical vapor deposition (CVD). In another embodiment, the coating may be physically transferred to the electronic device, such as by rolling or brushing. Regardless of the method of application, masks may be used to only coat certain desired areas or regions.

Figure 3:
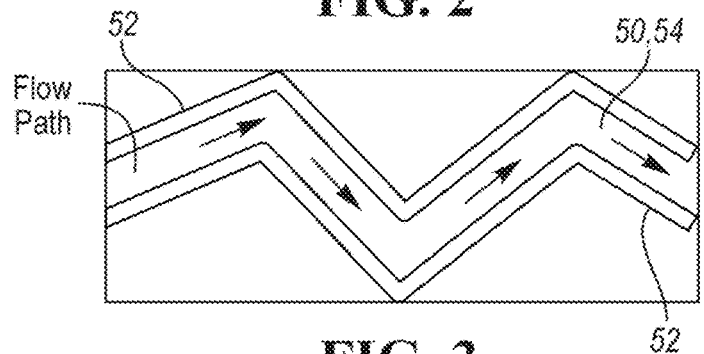
FIG. 3 is a top view of an exemplary coolant channel formed between two layers of hydrophobic or oleophobic coating.
Figure 4:
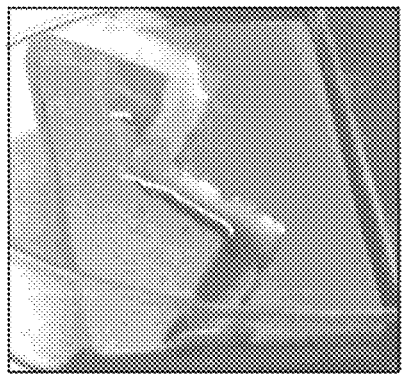
FIG. 4 is a photograph of a coolant channel formed by a (super) hydrophobic or oleophobic coating according to an embodiment.

With reference to FIGS. 3 and 4 a schematic example and photograph of an experimental sample are shown of a hydrophobic/oleophobic (hereinafter, "repellant") coating forming a flow path 50 for a liquid, such as coolant (e.g., water or ATF). The flow path 50 may be formed by one or more lines, strips, layers, or areas 52 of the repellant coating, forming boundaries. In the example shown in FIG. 3, two spaced apart lines 52 form the boundaries for the flow path 50. The lines 52 may be evenly spaced to form the flow path 50 having a constant or substantially constant width. However, in other embodiments, the flow path 50 may have a non-constant width. The lines 52 forming the boundaries may be configured to form a flow path 50 having any shape or pattern. In the embodiment shown in FIG. 3, the lines 52 form a zig-zag flow path 50, which may also be referred to as a sinuous, serpentine, winding, or oscillating flow path 50.

In at least one embodiment, the line(s) 52 of the repellant coating may form boundaries for the flow path 50 without any raised walls or sunken/carved channels. That is, the flow path 50 may be formed due solely to the repellence of the liquid (e.g., coolant) from the coating. The use of the boundary lines, strips, areas, etc. of the repellant coating may therefore allow for control or influence of the flow of coolant without the need for relatively large physical barriers, such as channels walls, trenches, or troughs. Instead, a coating may be used to control/influence the flow of coolant. For example, change the injection angle of the coolant to the end-windings or concentrate coolant at the edge of a rotor end plate. As shown in FIG. 4, the coating may be very thin so as to be essentially even or flush with the surface applied thereto relative to the height of the coolant being controlled. For example, the coating may have a thickness of less than 1 mm, such as less than 500 μm, 250 μm, 100 μm, 50 μm, 25 μm, or 15 μm.

In at least one embodiment, in addition to the boundary line(s) 52 of the repellant coating, a hydrophilic or oleophilic coating 54 may also be applied to form the flow path 50. In some embodiments, at least a portion of the area of the flow path 50 may be coated with the hydrophilic or oleophilic coating (herein after "wetting coating"). For example, the entire area of the flow path 50 may be coated with the wetting coating. In another embodiment, lines of the wetting coating may be applied within the flow path 50. For example, lines may be applied that are parallel to the lines 52 of the repellant coating. Accordingly, the wetting coating may help further control the flow of a coolant within the flow path. The lines 52 of the repellant coating may form an outer boundary of the flow path 50 while the wetting coating encourages the coolant to flow across it in the desired direction.

Coolant can be effectively distributed on the rotor end plates by forming coated regions using the repellant coating, and optionally the wetting coating. At low rotor speeds, coolant flows on uncoated surfaces due to low flow resistance. However, at high rotor speeds, the repellant coating increases an injection angle with strong flow momentum to overcome resistance on the coated surface. The repellant coating may also be used to control coolant flow paths on the rotor end plate, in addition to altering the injection angle of coolant toward the end-windings. The use of coating material for controlling coolant flow distribution in this manner may result in coolant jet flow in the electric machine with high heat transfer coefficients. Coolant jet flow also may effectively spread coolant on the end-windings of the stator core due to strong secondary flow after impinging, improving rotor spray cooling performance. Repellant coating material may be used in a pattern or lines forming boundaries, with or without wetting coating, to control coolant paths to effectively direct coolant to the end-windings and to specific areas on the rotor end plate, such as concentrating coolant on the edge of the rotor end plate.

Figure 5:
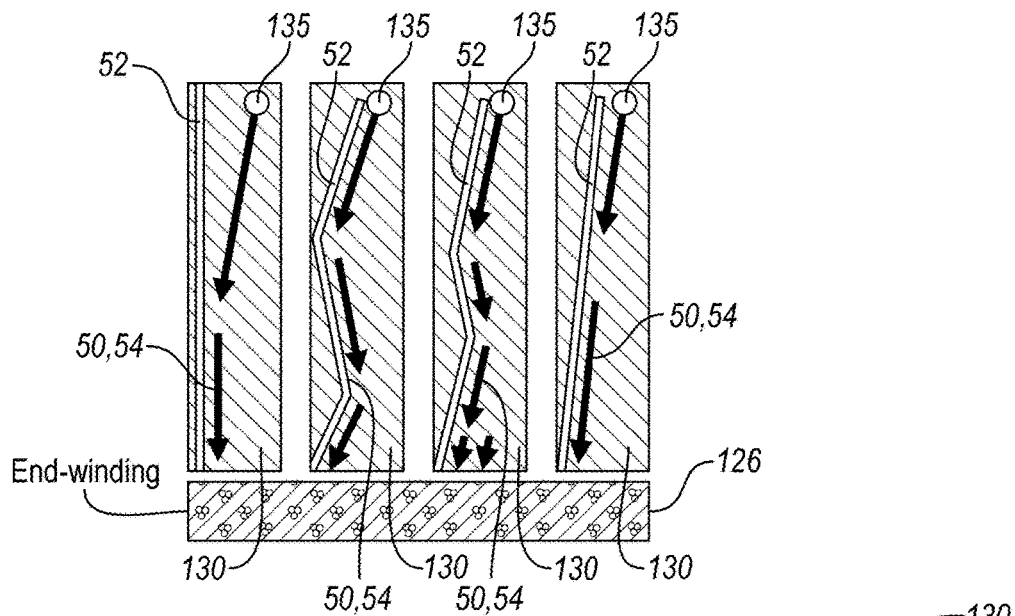
FIG. 5 shows examples of coolant flow path shapes or patterns that may be formed using a repellant coating on a rotor end plate, including coating in straight, zig-zag, zig-zag with a secondary flow path, and angled shapes, respectively.

With reference to FIG. 5, examples of different shapes and patterns of flow paths 50 that may be formed using the coatings are shown. The patterns shown are for illustrative purposes, and other patterns not shown may be formed by the coating boundaries and lines depending on the desired flow path for cooling. The first example of FIG. 5 shows a straight line of repellant coating 52 forming a boundary on the rotor end plate 130. Coolant flow path 50 flows at an angle from hole 135, into a straight path to the end-winding 126. FIG. 5 also shows a zig-zag line of repellant coating 52 forming a boundary on the rotor end plate 130. Coolant flow path 50 is a zig-zag path from hole 135 to the end-winding 126. Zig-zag flow path 50 may also be referred to as sinuous, serpentine, winding, or oscillating flow path 50. The third example of FIG. 5 shows a zig-zag line of repellant coating 52 forming a boundary on the rotor end plate 130, with an additional boundary 52 providing a flow distribution alteration for zig-zag flow path 50 from hole 135 before the end-windings 126. The additional boundary 52 may form a different pattern (e.g., different than a continuous line) and provide a secondary flow path 50 or a high injection angle to the end-windings 126. The fourth example in FIG. 5 shows a diagonal line of repellant coating 52 forming a boundary on the rotor end plate 130. Coolant flow path 50 flows at an angle from hole 135 along the boundary 52 to the end-winding 126. Although continuous boundaries are shown for illustrative purposes, segmented, intermittent, or non-continuous patterns and shapes of repellant coating may be used based on the desired coolant flow on the rotor end plate. Similar to the above with respect to FIGS. 3-4, a wetting coating 54 may also be applied in the flow path 50 to further control the coolant flow, however it is not required.

Figure 6A:
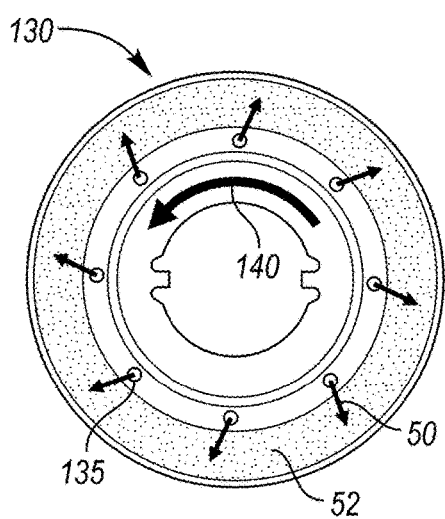
FIGS. 6A, 6B, and 6C are end views of exemplary rotor end plates with repellant coating to direct coolant flow, according to some embodiments.
Figure 6B:
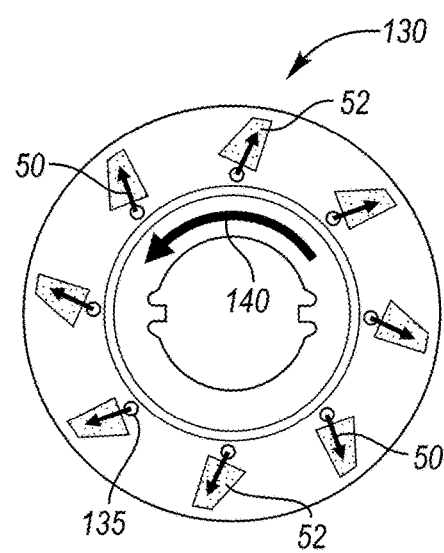
Figure 6C:
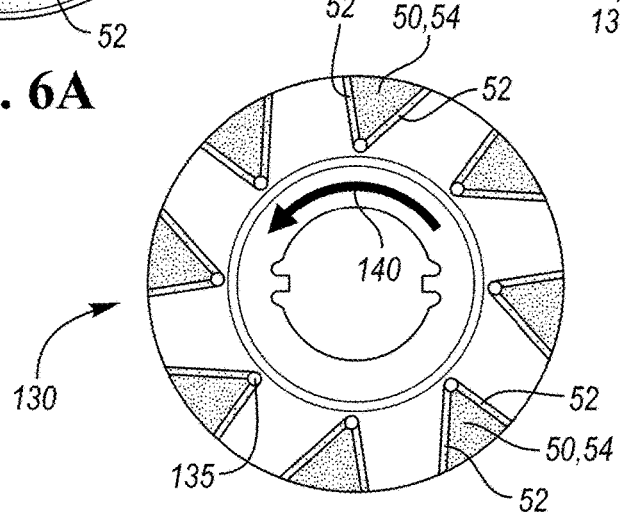

With reference to FIGS. 6A-6C, examples of different shapes and flow paths 50 that may be formed on the rotor end plate 130 are shown. According to an embodiment, in FIG. 6A, repellant coating 52 is coated on the rotor end plate 130 in the region between the holes 135 and the outer edge of the end plate 130. Coolant flow path 50 is shown with respect to rotation direction 140. Repellant coating 52 may control coolant flow and generate coolant jet flow with strong secondary flow after impinging, therefore improving rotor spray cooling performance. According to another embodiment, FIG. 6B shows rotor end plate 130 with portions of the region between the holes 135 and the outer edge of the end plate coated with repellant coating 52. As such, repellant coating 52 may control coolant flow along flow path 50 according to the direction of rotation 140 of the rotor. The repellant coating 52 may also generate coolant jet flow upon impinging. According to yet another embodiment, FIG. 6C shows two spaced apart lines or strips of repellant coating 52 forming boundaries for coolant flow path 50. The spaced apart lines start at holes 135 and expand to provide an expanding width flow path 50 to the outer edge of the end plate 130, according to the direction of rotation 140 of the rotor. Similar to the above with respect to FIGS. 3-5, a wetting coating 54 may also be applied in any of the above flow paths 50 to further control the coolant flow, however it is not required.

The examples shown and described in FIGS. 3-6 may relate to flow paths 50 in which the boundaries may be one or more continuous lines or strips of coating 52 to form at least one flow path. There may be more lines (e.g., two or more as shown in the examples), as well as boundaries not forming lines (such as segmented, intermittent, or non-continuous patterns or regions) included to control the flow of a liquid, such as coolant. Boundaries of coating 52 may be applied to rotor end plate 130 in order to prevent or reduce flow of liquid from passing that boundary and/or to keep liquid on one side of the boundary. In other examples, boundaries of coating 52 may be applied to the surface to create multiple flow paths 50 or alter the injection angle of coolant to the end-windings. In some embodiments, the repellant coating 52 may form intermittent steps for generating coolant jet flow, resulting in high heat transfer coefficients and strong secondary flow after impinging. Coolant coverage can be controlled using the repellant coating materials by changing the injection out-of-plane angles with respect to the rotor speed. In various embodiments, a single flow path 50 may be split into multiple flow paths such as two (bifurcated), three (trifurcated), or more flow paths. Multiple sets and types of boundaries 52 may also be used to form a plurality of discrete flow paths 50 and flow distributions. Similarly, lines, layers, strips, or areas of the wetting coating 54 may be applied in a portion of, or the whole, the flow path 50 to attract or encourage coolant to flow in a direction or flow path of the coating 54. The wetting coating 54 may be used in conjunction with the repellant coating for greater control of coolant flow.

In at least one embodiment, the repellant coating may be used to form one or more coolant flow paths 50 or generate coolant jet flow (by altering the injection angle of coolant) on the electric machine 100 rotor end plate 130. During operation of the electric machine 100, coolant, such as an oil-based coolant (e.g., ATF), may be introduced into the rotor via the rotor shaft to remove heat. The coolant may be introduced in a variety of ways depending on the design of the particular electric machine. In some designs, the coolant may be pumped or otherwise released into the rotor. The repellant coating and wetting coating may be applied to the surface of the rotor end plates 130 in order to control or affect the flow of coolant on the rotor end plate and the injection of coolant toward the end-windings 126 of stator core 102. The repellant coating may be used to form boundaries defining flow paths to provide more uniform coolant flow on the end plate 130 surface from the holes 135 to the end-windings 126 than if no coating were present. The repellant coating may also be used to form boundaries to guide or impinge coolant to areas requiring increased cooling or areas that would receive insufficient cooling if the coolant flow or injection angle was not adjusted. For example, areas that receive insufficient cooling may form areas called hot spots.

Figure 7A:
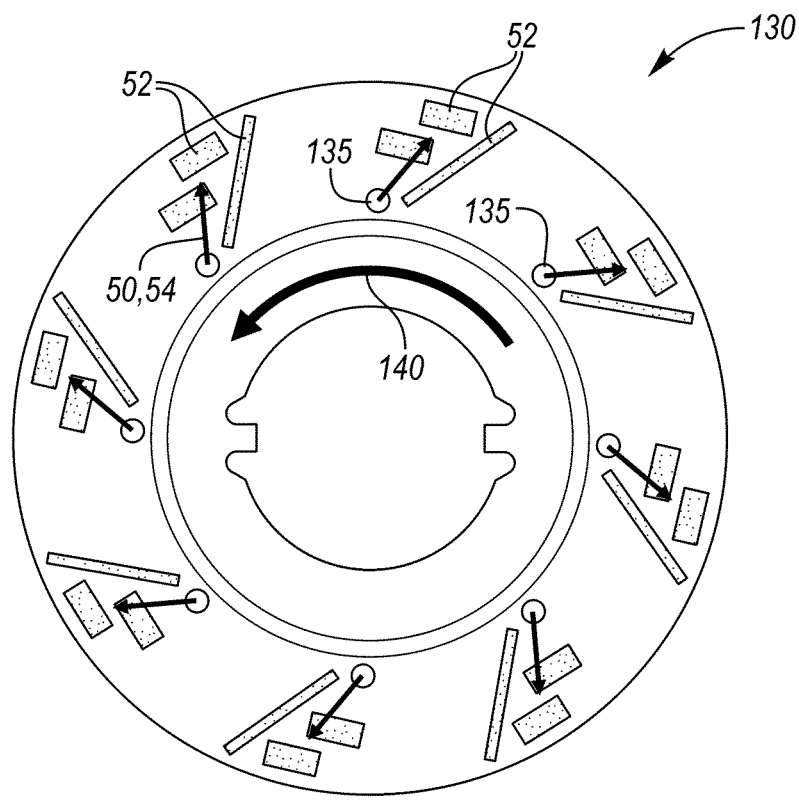
FIGS. 7A and 7B are end views of exemplary rotor end plates with repellant coating to alter injection angles of coolant, according to other embodiments.
Figure 7B:
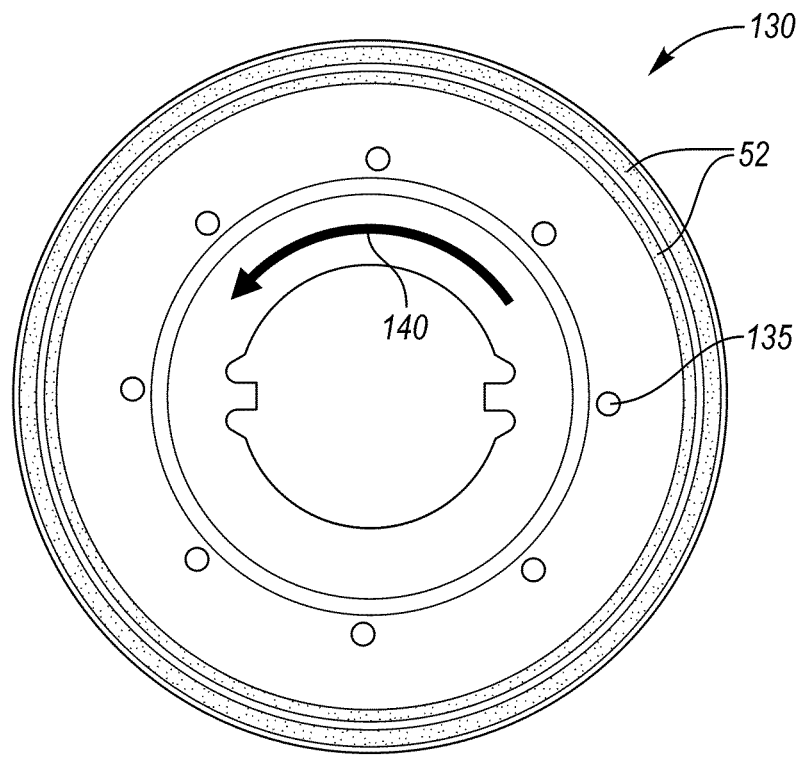

With reference to FIGS. 7A and 7B, examples of different shapes and patterns of coating 52 on the rotor end plate 130 is shown. In certain embodiments, the repellant coating 52 is used to generate jet flow of coolant or alter the injection angle of coolant from the holes 135 in the end plate 130 to the end-windings 126. The patterns shown in FIGS. 7A and 7B are merely examples, and other patterns may be formed depending on the desired flow of coolant and injection angle. FIG. 7A shows a boundary line of coating 52 as well as a stepped configuration of additional boundaries formed of coating 52. Coolant flow path 50, upon impinging the boundaries, may result in coolant jet flow with a strong secondary flow to the end-windings, or a higher injection angle of coolant to the end-windings. Similarly, in FIG. 7B, repellant coating 52 is circumferentially disposed on the surface of rotor end plate 130 at various points along the radius of the end plate 130. Coolant flows along flow path 50 (not shown) from holes 135 to the edge of the end plate 130, and impinges the boundaries such that coolant jet flow may be generated or the injection angle of coolant flow to the end-windings may be altered. Two spaced apart boundaries of coating 52 are shown for exemplary purposes, and any number of continuous or segmented boundaries may also be used based on the desired coolant flow and injection angle. Similar to the above with respect to FIG. 3-6, a wetting coating 54 may also be applied in flow path 50 to further control the coolant flow and/or injection angles, however it is not required.

Accordingly, (super) hydrophobic and/or oleophobic coating materials and/or (super) hydrophilic or oleophilic coating materials may be utilized in electric machines for thermal management. The use of these coating materials on the rotor end plate surface may allow for a controlled flow distribution and adjusted injection angles without fixtures on the end plate, which may require additional costs and may result in efficiency losses. In addition, the coating materials may improve the reliability of electric machines by eliminating localized hot spots and decreasing power loss. Moreover, a reduction in electric machine size may be realized due to the super hydrophobic/oleophobic coated surfaces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. An electric machine comprising:
   a stator core defining a cavity and having end-windings protruding from the cavity;
   a rotor configured to rotate within the cavity and having end plates defining a plurality of holes for providing coolant;
   one or more layers of an oleophobic or hydrophobic coating disposed on portions of the end plate corresponding to the holes to increase coolant flow to the end-windings; and
   one or more layers of an oleophilic or hydrophilic coating defining a coolant flow path on the end plates for directing coolant to the portions of the end plate in cooperation with the one or more layers of the oleophobic or hydrophobic coating.
2. The electric machine of claim 1, wherein coolant impinges the one or more layers of the oleophobic or hydrophobic coating generating coolant jet flow to the end-windings.

3. The electric machine of claim 1, wherein the one or more layers of the oleophobic or hydrophobic coating is a super oleophobic or hydrophobic coating having a contact angle with an oil-based or water-based coolant of at least 130 degrees, respectively.

4. The electric machine of claim 1, wherein each hole corresponds with one or more layers of the oleophobic or hydrophobic coating to direct coolant from the hole to the end-windings.

5. The electric machine of claim 1, wherein the one or more layers of the oleophobic or hydrophobic coating is disposed on portions of the end plate at an angle corresponding to the holes and rotation direction of the rotor.

6. An electric machine comprising:
 a stator core defining a cavity and having end-windings protruding from the cavity;
 a rotor configured to rotate within the cavity and having end plates defining a plurality of holes for providing coolant;
 one or more layers of an oleophobic or hydrophobic patterned coating defining at least one boundary on the end plate between the holes and end-windings to direct coolant on a flow path to the end-windings; and
 one or more layers of an oleophilic or hydrophilic patterned coating on the end plates in the flow path to direct coolant to the end-windings.

7. The electric machine of claim 6, wherein the one or more layers of the oleophobic or hydrophobic patterned coating define two spaced apart boundaries that define the flow path.

8. The electric machine of claim 6, wherein the one or more layers of the oleophobic or hydrophobic patterned coating define intermittent boundaries for coolant flow separation.

9. The electric machine of claim 8, wherein the intermittent boundaries include at least one boundary line forming a primary coolant flow path and at least one boundary step in a portion of the primary coolant flow path to form one or more secondary coolant flow paths.

10. The electric machine of claim 9, wherein the at least one boundary step is configured to generate coolant jet flow after impinging the boundary step.

11. The electric machine of claim 6, wherein the one or more layers of the oleophobic or hydrophobic patterned coating defines a zig-zag boundary to direct coolant flow on a zig-zag coolant flow path from the hole to the end-windings.

12. The electric machine of claim 6, wherein the one or more layers of the oleophobic or hydrophobic patterned coating is a super oleophobic or hydrophobic coating having a contact angle with an oil-based or water-based coolant of at least 130 degrees, respectively.

13. The electric machine of claim 6, wherein the at least one boundary is positioned according to a rotation direction of the rotor.

14. An electric machine comprising:
 a stator core defining a cavity and having end-windings protruding from the cavity;
 a rotor configured to rotate within the cavity and having end plates defining a plurality of holes for providing coolant;
 one or more layers of an oleophobic or hydrophobic patterned coating defining at least one ring on the end plate radially outward from the holes; and
 one or more layers of an oleophilic or hydrophilic patterned coating on the end plate defining a flow path for directing coolant to the at least one ring.

15. The electric machine of claim 14, wherein the one or more layers of the oleophobic or hydrophobic patterned coating is a super oleophobic or hydrophobic coating having a contact angle with an oil-based or water-based coolant of at least 130 degrees, respectively.

16. The electric machine of claim 14, wherein the one or more layers of the oleophobic or hydrophobic patterned coating are configured to generate coolant jet flow after impinging the at least one ring.

17. The electric machine of claim 14, wherein, based on a rotor speed, the at least one ring is positioned on the end plate and configured to inject coolant at a predefined coolant injection angle.

* * * * *